United States Patent [19]

Miyagi et al.

[11] Patent Number: 4,826,519
[45] Date of Patent: May 2, 1989

[54] MULTILAYER FILTER ELEMENT

[75] Inventors: Tokuya Miyagi, Osaka; Akihisa Inoue, Hirakata; Taisuke Ootsubo, Neyagawa; Shoichi Fujimori, Sakai, all of Japan

[73] Assignee: Kurashiki Boseki Kabushiki Kaisha, Okayama, Japan

[21] Appl. No.: 169,169

[22] Filed: Mar. 11, 1988

Related U.S. Application Data

[63] Continuation of Ser. No. 899,844, Aug. 25, 1986, abandoned.

[30] Foreign Application Priority Data

Aug. 28, 1985 [JP] Japan ............................ 60-190493

[51] Int. Cl.⁴ .................... B01D 29/06; B01D 29/14
[52] U.S. Cl. .................................. 55/487; 55/488; 55/492; 55/501
[58] Field of Search .............. 55/97, 158, 482, 487, 55/492, 501, 485, 486, 488, 489

[56] References Cited

U.S. PATENT DOCUMENTS

| | | | |
|---|---|---|---|
| 2,055,853 | 9/1936 | Schwartz | 55/482 X |
| 2,062,834 | 12/1936 | Schwartz | 55/482 X |
| 2,933,154 | 4/1960 | Lauterbach | 55/97 |
| 3,010,536 | 11/1961 | Plurien et al. | 55/158 |
| 3,208,205 | 9/1965 | Harms et al. | 55/472 |
| 3,258,900 | 7/1966 | Harms | 55/487 X |
| 3,332,216 | 7/1967 | Stern | 55/158 |
| 3,399,516 | 9/1968 | Hough, Jr. et al. | 55/487 |
| 3,447,288 | 6/1969 | Juda et al. | 55/158 |
| 3,499,265 | 3/1970 | Langley et al. | 55/158 |
| 3,505,794 | 4/1970 | Nutter et al. | 55/487 |
| 3,668,837 | 6/1972 | Gross | 55/158 |
| 4,157,968 | 6/1979 | Kronsbein | 55/485 X |
| 4,184,966 | 1/1980 | Pall | 55/487 X |
| 4,243,536 | 1/1981 | Prölss | 55/158 X |
| 4,268,279 | 5/1981 | Shindo et al. | 55/158 X |
| 4,324,574 | 4/1982 | Fagan | 55/487 |
| 4,487,606 | 12/1984 | Leviton et al. | 55/482 X |
| 4,631,077 | 12/1986 | Spicer et al. | 55/487 |
| 4,650,506 | 3/1987 | Barris et al. | 55/487 |

FOREIGN PATENT DOCUMENTS

| | | | |
|---|---|---|---|
| 30079 | 3/1978 | Japan | 55/486 |
| 58269 | 5/1979 | Japan . | |
| 14780 | 6/1979 | Japan | 55/487 |
| 39808 | 8/1982 | Japan . | |
| 126655 | 8/1982 | Japan . | |
| 62323 | 4/1984 | Japan | 55/492 |

*Primary Examiner*—Robert Spitzer
*Attorney, Agent, or Firm*—Armstrong, Nikaido, Marmelstein & Kubovcik

[57] ABSTRACT

The present invention relates to a filter element suitable for the purification of gas, in which spaces are constituted with porous spacer between plural membrane filters. Particles or dusts captured in the filter element of the present invention are prevented from rescattering under the impulsive pressure at the initiation or termination of the filtration, so that the high precision of the filtration can be achieved.

6 Claims, 1 Drawing Sheet

MULTILAYER FILTER ELEMENT

This application is a continuation of application Ser. No. 899,844 filed Aug. 25, 1986, now abandoned.

BACKGROUND

In recent years a microporous membrane made of synthetic resin is widely used for the fine filtration of fine particles in liquid or gas because of its excellent properties for the removal of the particles. There are two types of such a membrane. One type of membrane has plural micropores independently penetrating from one surface thereof to the other surface, and the other type of the microporous membrane consists of superfine resinous fibers three-dimensionaly intertwined. The former has not been used as a filter element excepting special uses, because the porosity percent of the former is smaller, so that the pressure loss is larger. Accordingly, as a filter element the latter is often used. This kind of filter has surface filter function to capture particles larger than the pore size and internal filter function to capture particles smaller than the pore size.

In the case of gas filtration the efficiency of internal filtration is so large that even particles of 1/20 of average pore size of membrane can be captured. However, such a membrane has a following serious defect in gas filtration. That is, at the filtration of gas using the filter element equipped with a membrane filter many particles to be captured by the membrane leak into the filtered gas, when an impulsive pressure such as at the initiation of the filtration is applied to the membrane, though no problem occurs when the gas passes constantly. The reasons are considered that when the impulsive pressure is applied, the flow rate of gas in the pore rapidly increases, and the ability of the membrane to capture the particles decreases, so that particles in the inlet gas can not be captured and pass through the membrane or the particles which have been captured by the membrane are scattered again into the filtered gas (the both are referred to as "re-scatter" hereinafter).

It had been believed that the rescattering did not occur in a membrane filter. Therefore, the improvement of filter element equipped with the membrane filter had been concentrated in the improvements of life and of capturing efficiency at steady flow.

On the other hand, a multi-layer filter element is known. For example, there is disclosed in Japanese Pat. KOKAI No. 82918/1984 a multi-layer filter in which the pore size of the inside filter layer is 0.3 to 0.8 times the pore size of the outside filter layer. The filter layer of the above is a close multi-layer type, but has no space between the layers, and the filter element is restrictively used for the treatment of liquid. At least it does not suggest that the provision of a space between the filter layers is effective to prevent the rescattering of dust in gas filtration.

Japanese patent publication No. 33369/1980 discloses a multi-layer filter element packed with adsorbents between filter membranes. However, this filter element has no spaces and is for the adsorption of soluble materials in water on the adsorbents. In addition, there is no suggestion to prevent the rescattering of dust in gas.

Japanese Pat. Kokai No. 61018/1985 discloses a filter element having two kinds of porous membrane made of PTFE, which are different in the pore size and are overlapped, but it suggests neither the spaces between the membranes nor the prevention of rescattering of the dust.

Japanese Utility Model Publication No. 23614/1980 discloses an oil filter having overlapped filament layers different in density. This filter can be used as air filter, but it does not suggest the existence of spaces and their effects achieved by the existence.

SUMMARY OF THE INVENTION

The present invention relates to a filter element suitable for the purification of gas, in which spaces are constituted with porous spacer between plural membrane filters. Particles or dust captured in the filter element of the present invention are prevented from rescattering under impulsive pressure at the initiation or termination of the filtration, so that the high precision of the filtration can be achieved.

DETAILED DESCRIPTION OF THE INVENTION

The present invention relates to a multilayer filter element which comprises a multilayer filter section on a supporter permeable to a fluid, in which the filter section has numerous spaces formed by arranging a porous spacer between membrane filters.

Figure 2:
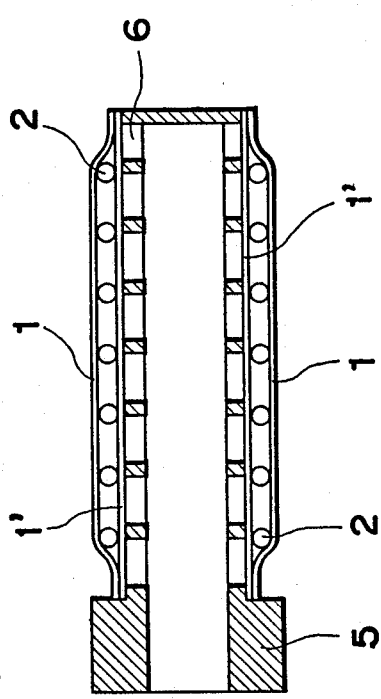
FIG. 2 is a schematic sectional view of the filter element.
Figure 1:
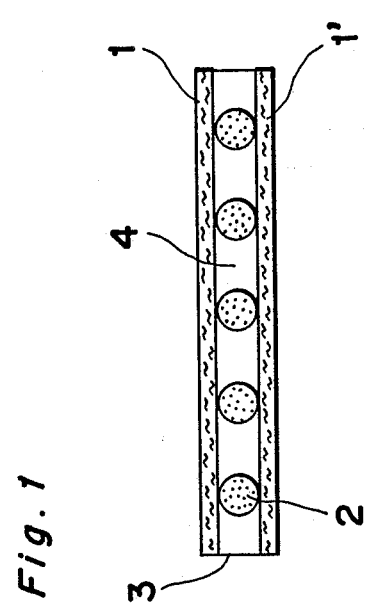
FIG. 1 is a schematic sectional view of the filter section of the present invention.

One embodiment of the filter element of the present invention is shown in FIGS. 1 and 2.

FIG. 1 is a partial schematic view of filter section (3) of the present invention, and spaces (4) are formed with spacers (2) which are put between filter membranes (1) and (1') as a sandwich. FIG. 2 shows a tubular porous support (5) on which a filter section is formed. The pores on the support are shown by (6). A filter section having many layers may be formed on the supporter, but usually two layers of membrane filter and one layer of spacer are sufficient.

The membrane filter used in the present invention may be a resinous microporous membrane, and preferably be 20–200 micrometers in thickness and has an average pore size of 0.01–20 micron meters. The material of the membrane includes preferably nitrocellulose, triacetyl cellulose, reproduced cellulose, polyvinyl chloride, polycarbonate, polyamide, polysulfone, polyvinylidene fluoride, polytetrafluoroethylene, polyethylene, polypropylene, which are not restricted.

If fiber layers such as a nonwoven fabric are used instead of a solid membrane filter, the filter section becomes not only thick but also the efficiency of prevention of rescattering becomes insufficient.

A preferable result can be obtained by arranging the membrane layer of smaller pores at the inlet-side of the fluid. In other words the filter membrane having smaller pores is arranged on the outside and the other one having larger pores on the inside.

A preferable porous spacer of the present invention has numerous porous spaces and a flexibility sufficient to be able to form the filter element by putting it between the filter membranes. The area of the single space is preferably so small that the reduction of the distance between outer and inner membranes can be kept up to 50%, when pulse pressure such as impulse pressure is applied on the outer membrane. It means that the porous spacer functions as a supporter for the outer membrane. The surface porosity percent of the spacer depends on the thickness and strength of the membrane to be used and pressure loss of gas. The minimum surface porosity percent of the spacer is preferably set such that the pressure loss by the spacer does not exceed 1/10 of the pressure loss caused by the filter membrane in order to control the increase of whole pressure loss of the filter element. In general, it is preferable a thicker spacer is used when a thinner membrane filter is used. In addition, as the thickness of the spacer is larger, the efficiency of prevention of the rescattering is improved, but too thick a spacer is not preferable, because if a thicker spacer is used, the larger filter element becomes. In general, the thickness of the spacer is preferably 1–20 times the thickness of the filter membrane.

Materials for the porous spacer are scrim cloth such as textiles, knitted items, nonwovens, and molded nets of synthetic thermoplastic resin, punched films, sheets and the like, but they are not restricted.

The porous spacer may be adhered to the membrane filter on one surface or both surfaces. The spaces may be formed by layering two or more thinner spacers.

As a spacer materials having direct paths such as scrim cloth, porous film, molded net and the like are more preferable than materials having complex paths such as non-fabric. FIG. 1 shows the one embodiment of spacer (2).

Though it is not clear the reason why the multilayer filter element has such an excellent efficiency to prevent the rescattering, it is supposed that the influence upon the internal membrane filter by the pulse pressure is reduced.

The present invention is illustrated by Examples, but it should not be interpreted that it is restricted by them.

EXAMPLE 1

(1) The production of filter element:

As shown in FIG. 2 a porous filter membrane (1') of PTFE available from Sumitomo Denko K.K. (average pore diameter being 5 micrometers, and thickness being 100 micrometers) is wound around the filter part of a porous tubular supporter of PFA (5) (outer diameter of the filter part: 10 mm, inner diameter: 7 mm, total pore area: 7.6 cm² and length: 40 mm). On the filter membrane a sheet of porous spacer (2) made of PFA net (thread diameter of 0.15 mm, thickness 0.3 mm and 50 meshes) is wound, and then another porous filter membrane (1) which is the same material as the above is wound. Each edge of the above items is sealed by heat and both end parts are adhered on the supporter by heat-welding to give a tubular filter element. The active filtering area of the obtained filter element is 12.6 cm².

Figure 3:
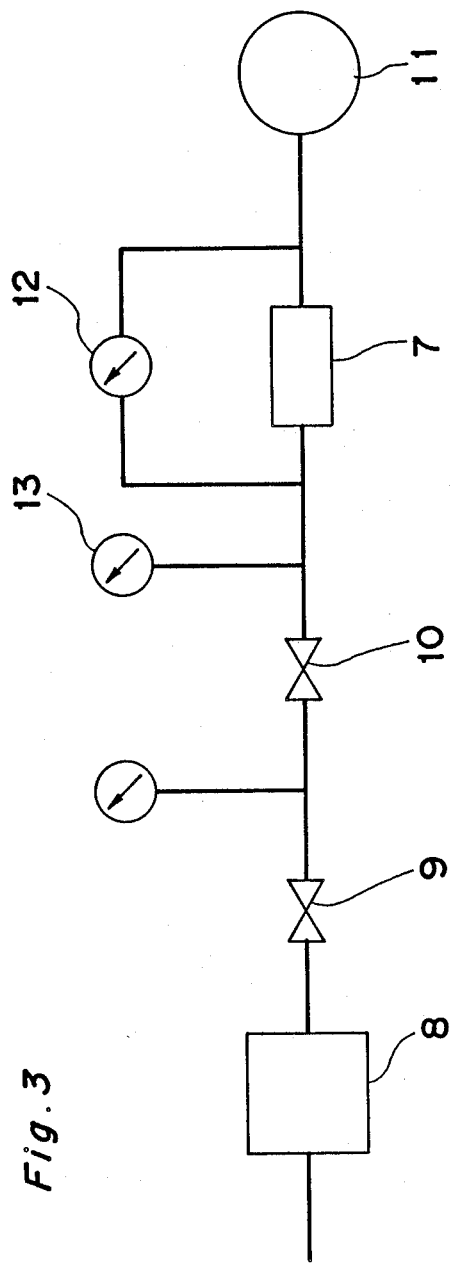
FIG. 3 is a schematic view of the apparatus used in the Examples.

(2) Contamination of membrane:

The filter element obtained is enclosed in a housing and is set up as in FIG. 3 without air-bag (11). The air dehumidificated by dehydrator (not shown) is passed through a fluidized bed (8) containing kaolin clay fine powders to be sent at a flow rate of 15 liter/minute. Shut-off-valves (9) and (10) are opened and the air containing the kaolin clay is passed through the filter (7). The filter is gradually clogged up. When a differential pressure gauge (12) indicates 0.03 Kg/cm², a valve (10) is closed. The particle distribution of kaolin clay obtained from the fluidized bed is shown in Table 1.

TABLE 1

| particle size (micrometer) | 0.3–0.5 | 0.5–1.0 | 1.0–2.0 | 2.0–5.0 | ≧5.0 |
|---|---|---|---|---|---|
| percent | 28.0 | 29.7 | 27.1 | 14.4 | 0.8 |

(3) Determination of rescattering particle:

An air bag (11) is set up as illustrated in FIG. 3. The shut-off-valve is instantaneously opened and then closed to collect the air passing through the filter membrane during the open period in the air bag. The instantaneous maximum inlet pressure on a pressure gauge (13) at the above operation is referred to as pulse pressure. The number of particles having a particle size of not less than 0.3 micrometer in the air collected is determined by a particle counter (not shown in FIG. 3). The particle counter as used is Particle Counter KC-01A available from Lion Corporation. Result is shown in Table 2.

EXAMPLES 2–4 AND COMPARATIVE EXAMPLES 1–3:

The number of rescattering particles is determined as the same manner as Example 1 excepting using filters as shown in Table 2. The results are shown in Table 2, in which the order of the membrane filters accords with the order of pass of the air. The expression "10 micron+S+5 micron" means that a membrane filter having an average diameter of 10 micrometers is set up outermost, a spacer (S) at the middle and a membrane filter having an average pore size of 5 micrometers innermost. S' indicates the use of three sheets of spacer.

TABLE 2

| | filters | | | | | | |
|---|---|---|---|---|---|---|---|
| | Example | | | | Comparative Exam. | | |
| pulse pressure (kg/cm²) | 1 $5\mu + S + 5\mu$ | 2 $10\mu + S + 5\mu$ | 3 $5\mu + S + 10\mu$ | 4 $10\mu + S + 5\mu$ | 1 $5\mu$ | 2 $5\mu + 5\mu$ | 3 $10\mu + 5\mu$ |
| 0.7 | 0 | 8 | 0 | 0 | 31 | 0 | 12 |
| 1.0 | 74 | 78 | 19 | 16 | 187 | 109 | 125 |
| 1.4 | 85 | 96 | 25 | 66 | 490 | 156 | 183 |
| 1.8 | 148 | — | — | — | — | 646 | — |

What is claimed is:

1. A filter for gas filtration comprising, in order in the direction from downstream to upstream:
   (a) a porous support;
   (b) a first membrane filter medium formed from a resinous, microporous membrane;
   (c) a porous spacer; and
   (d) a second membrane filter medium formed from a resinous microporous membrane and having a pore size smaller than the pore size of said first membrane medium.

2. A filter according to claim 1, wherein said porous spacer is a flexible spacer.

3. A filter according to claim 1, wherein said spacer has a thickness of 1 to 20 times the thickness of the thicker of said first membrane filter medium and said second membrane filter medium.

4. A filter according to claim 1, wherein said spacer is not adhered to at least one of said first and second membrane filter media.

5. A filter according to claim 1, wherein said spacer is not adhered to said first membrane filter medium.

6. A filter according to claim 1, wherein said porous support is cylindrical.

* * * * *